US012632686B2

(12) United States Patent
Feinstein et al.

(10) Patent No.: US 12,632,686 B2
(45) Date of Patent: May 19, 2026

(54) BROADCAST USER INDICATIONS

(71) Applicant: ZEBRA TECHNOLOGIES CORPORATION, Lincolnshire, IL (US)

(72) Inventors: Nina Feinstein, Hicksville, NY (US); Mariya Wright, Cortland Manor, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 237 days.

(21) Appl. No.: 18/531,255

(22) Filed: Dec. 6, 2023

(65) Prior Publication Data
US 2025/0190732 A1     Jun. 12, 2025

(51) Int. Cl.
*G06K 17/00*     (2006.01)
*G06K 19/07*     (2006.01)

(52) U.S. Cl.
CPC ..... *G06K 17/0022* (2013.01); *G06K 19/0723* (2013.01)

(58) Field of Classification Search
CPC ........... G06K 17/0022; G06K 19/0723; G06K 17/0025; G06K 17/0029
See application file for complete search history.

(56) References Cited

U.S. PATENT DOCUMENTS

| | | | |
|---|---|---|---|
| 2021/0150298 A1* | 5/2021 | Salimi Jazi ...... | G06K 19/06028 |
| 2021/0362068 A1* | 11/2021 | Watanabe .......... | G06K 19/0723 |
| 2022/0321744 A1* | 10/2022 | Rao ......................... | A47F 10/02 |
| 2023/0289723 A1* | 9/2023 | Lewis .............. | G06K 19/07707 |
| 2024/0046318 A1* | 2/2024 | Muriqi ............... | G06Q 30/0273 |

* cited by examiner

*Primary Examiner* — Sisay Yacob

(57) ABSTRACT

Techniques for broadcasting user indications are provided. An example system includes a transmitter device that does not include a user interface display or verbal audio capabilities, that is configured to: detect an event and broadcast a signal including one or more of an alphanumeric string or a binary encoded message associated with the detected event as a unidirectional message via a first protocol that is receivable by a plurality of receiver devices, and a receiver device that includes a user interface comprising one or more of a user interface display or verbal audio capabilities, the receiver device being configured to: receive the broadcasted signal from the transmitter device, analyze the signal to identify the event associated with the signal; and generate a notification associated with the event via the user interface, without transmitting, via the first protocol, a response signal that is receivable and interpretable by the transmitter device.

15 Claims, 4 Drawing Sheets

BROADCAST USER INDICATIONS

BACKGROUND

Currently, certain devices (such as barcode readers, RFID readers, etc.) have a limited set of user indication capabilities. Accordingly, there is a need for systems and methods that enable these devices without sophisticated user interfaces to convey messages to users.

SUMMARY

In an embodiment, the present invention includes a system, comprising: a transmitter device that does not include a user interface display or verbal audio capabilities, the transmitter device being configured to: detect an event; and broadcast a signal including one or more of an alphanumeric string or a binary encoded message associated with the detected event via a first protocol that is receivable by a plurality of receiver devices, the signal being broadcast as a unidirectional message; and a receiver device that includes a user interface comprising one or more of a user interface display or verbal audio capabilities, the receiver device being configured to: receive the broadcasted signal from the transmitter device; analyze the signal to identify the event associated with the signal; and generate a notification associated with the event via the user interface, without transmitting, via the first protocol, a response signal that is receivable and interpretable by the transmitter device.

In a variation of this embodiment, the transmitter device includes an imaging assembly configured to capture images of a symbology and a decode module configured to decode a payload of the symbology, wherein the transmitter device is further configured to transmit the decoded payload of the symbology via a bi-directional message transmitted via a second protocol.

For instance, in a variation of this embodiment, the receiver device is configured to transmit, via the second protocol, a response signal that is receivable and interpretable by the transmitter device.

Moreover, in a variation of this embodiment, the transmitter device includes a radiofrequency identification (RFID) assembly configured to read data associated with an RFID tag, wherein the transmitter device is further configured to transmit an indication of the data associated with the RFID tag via a bi-directional message transmitted via a second protocol.

Additionally, in a variation of this embodiment, the receiver device is a subscriber of a service that provides data mapping respective alphanumeric strings to respective detected events, and is configured to analyze the alphanumeric string of the unencrypted signal to identify the detected event associated with the alphanumeric string based on the data mapping respective alphanumeric strings to respective detected events. For example, the detected event may be one of: a detected expiration of an item associated with the symbology, a detected off-platter event for an item associated with the symbology, a detected location of the transmitter device that is outside of a predetermined geo-fenced area, etc., and particular alphanumeric strings may correspond to respective detected events.

In another embodiment, the present invention includes a transmitter device that does not include a user interface display or verbal audio capabilities, wherein the transmitter device is configured to perform steps comprising: detecting an event; and broadcasting a signal including one or more of an alphanumeric string or a binary encoded message associated with the detected event, the signal being broadcast as a unidirectional message, via a first protocol that is receivable by a plurality of receiver devices that each include a respective user interface comprising one or more of a user interface display or verbal audio capabilities, wherein each of the plurality of receiver devices are configured to receive the broadcasted signal from the transmitter device, analyze the signal to identify the event associated with the signal, and generate a notification associated with the event via the user interface, without transmitting, via the first protocol, a response signal that is receivable and interpretable by the transmitter device.

In a variation of this embodiment, the transmitter device further includes an imaging assembly configured to capture images of a symbology and a decode module configured to decode a payload of the symbology, wherein the transmitter device is further configured to transmit the decoded payload of the symbology via a bi-directional message transmitted via a second protocol.

For instance, in a variation of this embodiment, the receiver device is configured to transmit, via the second protocol, a response signal that is receivable and interpretable by the transmitter device.

Moreover, in a variation of this embodiment, the transmitter device further includes a radiofrequency identification (RFID) assembly configured to read data associated with an RFID tag, wherein the transmitter device is further configured to transmit an indication of the data associated with the RFID tag via a bi-directional message transmitted via a second protocol.

Additionally, in a variation of this embodiment, the receiver device is a subscriber of a service that provides data mapping respective alphanumeric strings to respective detected events, and is configured to analyze the alphanumeric string of the unencrypted signal to identify the detected event associated with the alphanumeric string based on the data mapping respective alphanumeric strings to respective detected events. For example, the detected event may be one of: a detected expiration of an item associated with the symbology, a detected off-platter event for an item associated with the symbology, a detected location of the transmitter device that is outside of a predetermined geo-fenced area, etc., and particular alphanumeric strings may correspond to respective detected events.

In yet another embodiment, the present invention includes a method performed by a transmitter device that does not include a user interface display or verbal audio capabilities, the method comprising: detecting an event; and broadcasting a signal including one or more of an alphanumeric string or a binary encoded message associated with the detected event, the signal being broadcast as a unidirectional message, via a first protocol that is receivable by a plurality of receiver devices that each include a respective user interface comprising one or more of a user interface display or verbal audio capabilities, wherein each of the plurality of receiver devices are configured to receive the broadcasted signal from the transmitter device, analyze the signal to identify the event associated with the signal, and generate a notification associated with the event via the user interface, without transmitting, via the first protocol, a response signal that is receivable and interpretable by the transmitter device.

In a variation of this embodiment, the method further includes capturing, by an imaging assembly of the transmitter device, images of a symbology; decoding a payload of the symbology; and transmitting the decoded payload of the symbology via a bi-directional message transmitted via a second protocol.

For instance, in a variation of this embodiment, the receiver device is configured to transmit, via the second protocol, a response signal that is receivable and interpretable by the transmitter device.

Moreover, in a variation of this embodiment, the method further includes reading, by a radiofrequency identification (RFID) reader of the transmitter device, data associated with an RFID tag; and transmitting an indication of the data associated with the RFID tag via a bi-directional message transmitted via a second protocol.

Additionally, in a variation of this embodiment, the receiver device is a subscriber of a service that provides data mapping respective alphanumeric strings to respective detected events, and is configured to analyze the alphanumeric string of the unencrypted signal to identify the detected event associated with the alphanumeric string based on the data mapping respective alphanumeric strings to respective detected events. For example, the detected event may be one of: a detected expiration of an item associated with the symbology, a detected off-platter event for an item associated with the symbology, a detected location of the transmitter device that is outside of a predetermined geofenced area, etc., and particular alphanumeric strings may correspond to respective detected events.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
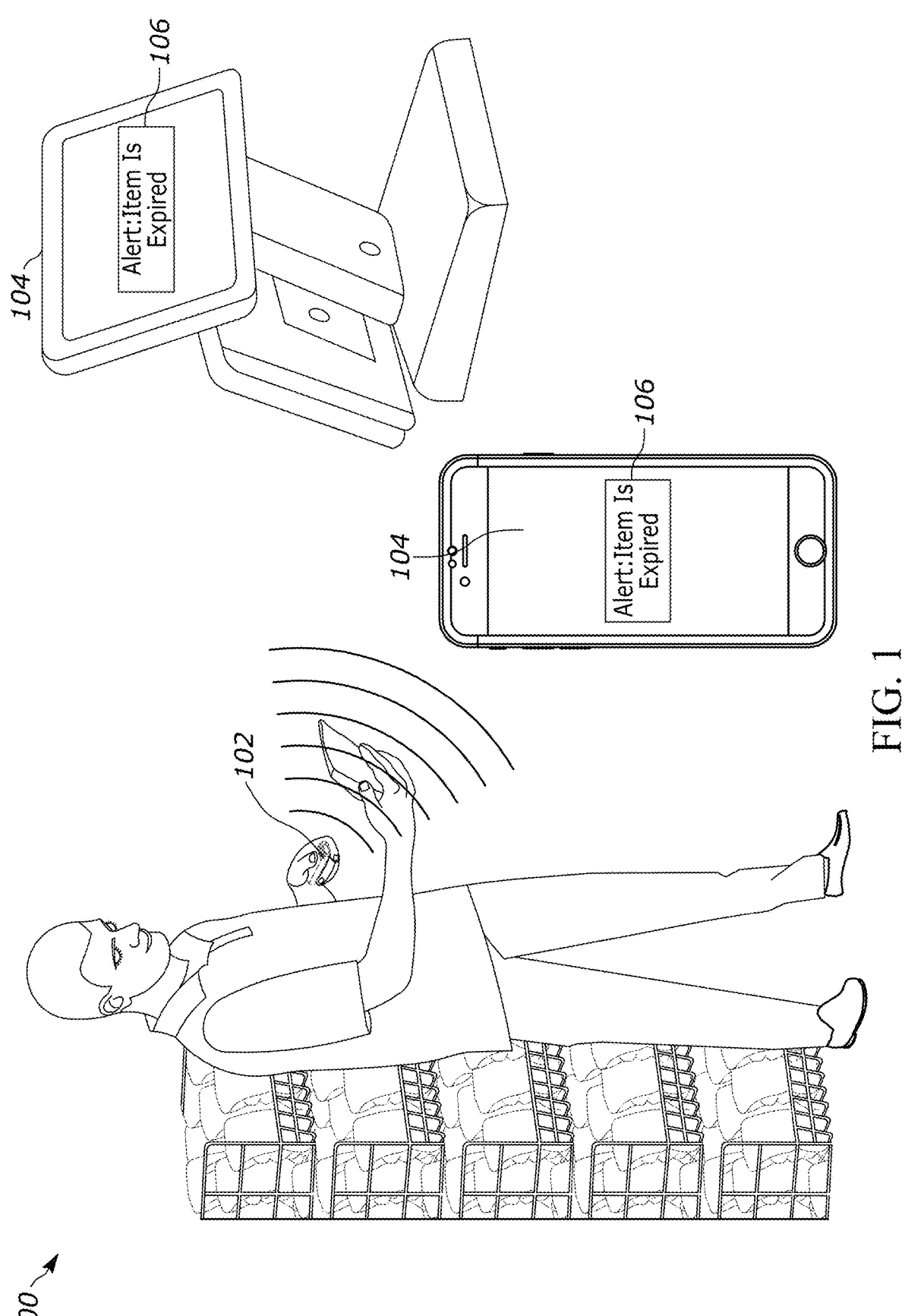
FIG. 1 illustrates an example retail environment, in which the techniques provided herein may be implemented, such as techniques for broadcasting user indications from devices that do not include a user interface display or verbal audio capabilities to devices that do include a user interface display or verbal audio capabilities.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Currently, certain devices (such as barcode readers, RFID readers, etc.) do not have sophisticated user interfaces, and instead rely on a system of beeps, tones, or other audio indicators to convey information to users. For instance, users must count a number of beeps produced by a device, or differentiate between high and low beep tones produced by the device, and use a table that lists event messages corresponding to the various number of beeps, the high tones, the low tones, etc. that the device produces.

The present disclosure provides systems and methods for broadcasting user indications from devices that do not include a user interface display or verbal audio capabilities to devices that do include a user interface display or verbal audio capabilities. A transmitter device (which may be or include a barcode reader, an RFID reader, etc.) a user interface display or verbal audio capabilities may detect an event. For instance, the event may be an indication that an item associated with a barcode read by the barcode reader and/or an item associated with an RFID tag read by the RFID reader is expired (e.g., a food item and/or a medication item may be expired). As another example, the event may be an indication that an item is placed incorrectly on a scale associated with a POS, or is hanging from the side of the POS. As still another example, the event may be an indication that the device has left a geofenced area (e.g., an area associated with a retail environment).

The transmitter device may broadcast a signal that includes a code (e.g., an alphanumeric string, a binary encoded message, etc.) associated with the event. The signal may be broadcast in a recipient-agnostic manner as a uni-directional message over a first protocol (a wired protocol such as USB, a wireless protocol such as Wifi, BLUETOOTH, BLE, etc.) that is receivable by any of a number of possible receiver devices, such as user devices (e.g., smart phones, laptops, tablets, smart watches or other wearable devices, etc.), point-of-sale (POS) devices, etc., that do include user interface displays or verbal audio capabilities. These receiver devices may receive the broadcasted signal from the transmitter device and analyze the signal to identify the event associate with the signal, and may generate notifications to users associated with the event via their user interface displays and/or verbal audio capabilities. Generally speaking, the receiver devices do not transmit return signals via the first protocol that are receivable and interpretable by the transmitter device, although in some examples, the receiver devices may transmit signals that are receivable and interpretable by the transmitter device via another protocol.

Referring now to FIG. 1, shown therein is an example retail environment 100 in which the techniques provided herein for broadcasting user indications from devices that do not include a user interface display or verbal audio capabilities to devices that do include a user interface display or verbal audio capabilities may be implemented. For instance, as shown in FIG. 1, a user may use a handheld device 102 that includes a barcode reader to read a barcode of a food product. A barcode reader of the handheld device 102 may analyze a barcode attached to the food product to decode a payload associated with the barcode. The payload may, for instance, include an indication of an expiration date of the food product. The handheld device 102 may compare the expiration date of the food product to the current date and may determine that a product expiration event has occurred. The handheld device 102 may generate an alphanumeric string or binary encoded message associated with the event, and may broadcast a unidirectional signal including the alphanumeric string or binary encoded message that is receivable by various receiver devices 104, such as a smartphone and a POS device. The receiver devices 104 may receive the signal and may analyze the alphanumeric string or binary encoded message to identify the event associated with the alphanumeric string or binary encoded message (e.g., by accessing a database storing indications of alphanumeric strings, binary encoded messages, etc., and events associated with each one), and may generate a notification 106 related to the event (e.g., a popup notification with text that states "Alert: Item is Expired"). The receiver devices 104 may display the notification 106 via respective user interface displays.

Figure 2:
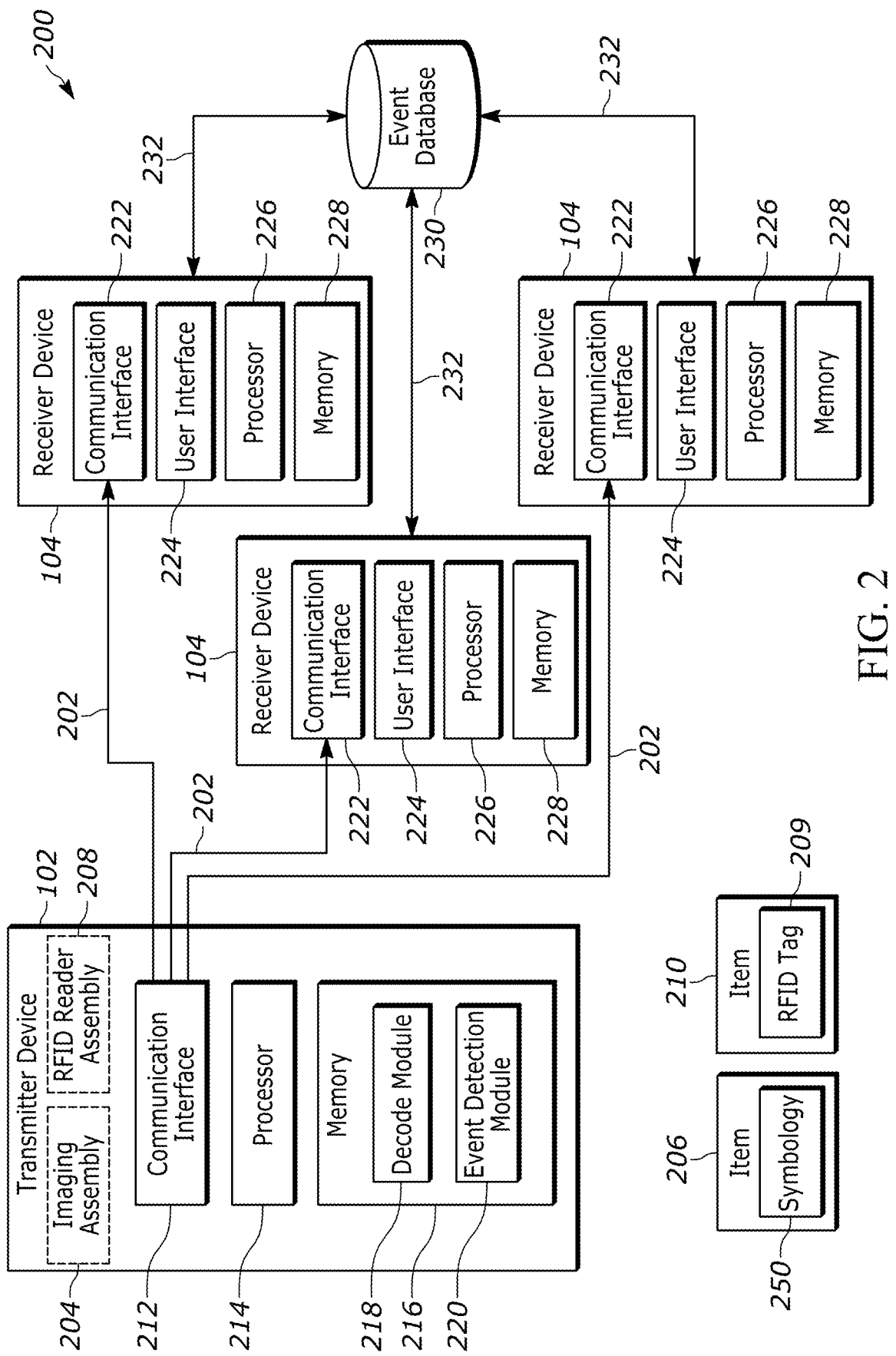
FIG. 2 illustrates an example system 200 where embodiments of the present invention may be implemented, such as techniques for broadcasting user indications from devices that do not include a user interface display or verbal audio capabilities to devices that do include a user interface display or verbal audio capabilities.

FIG. 2 illustrates an example system 200 where embodiments of the present invention may be implemented, such as techniques for broadcasting user indications from devices that do not include a user interface display or verbal audio capabilities to devices that do include a user interface display or verbal audio capabilities. The system 200 may include a transmitter device 102 and one or more receiver devices 104 (e.g., smart phones, laptops, tablets, smart watches or other wearable devices, point-of-sale (POS) devices, etc.), configured to communicate via a unidirectional signal 202 broadcast from the transmitter device 102 to the receiver device(s) 104 via a first protocol (e.g., a wired protocol such as USB, or a wireless protocol such as Wifi, BLUETOOTH, BLE, etc.).

In some examples, the transmitter device 102 may include an imaging assembly 204 (e.g., one or more cameras, image sensors, etc.) configured to capture images of items, symbologies (such as barcodes, QR codes, etc.) associated with items, users, etc. For instance, the imaging assembly 204 may capture an image of a symbology 205 associated with an item 206. Furthermore, in some examples, the transmitter device 102 may include an RFID reader assembly 208 configured to detect RFID tags, read data associated with RFID tags, etc. For instance, the RFID reader assembly 208 may detect and/or read data associated with an RFID tag 209 associated with an item 210. Additionally, the transmitter device 102 may include a communication interface 212 configured to broadcast unidirectional signals 202 to the receiver device(s) 104 via a first protocol. Moreover, the communication interface 212 (or another communication interface) may, in some embodiments, send bi-directional signals (not shown) to the receiver device(s) 104 via a second protocol that is different from and distinct from the first protocol. Furthermore, the transmitter device 102 may include one or more processors 214 and a memory 216.

Figure 3:
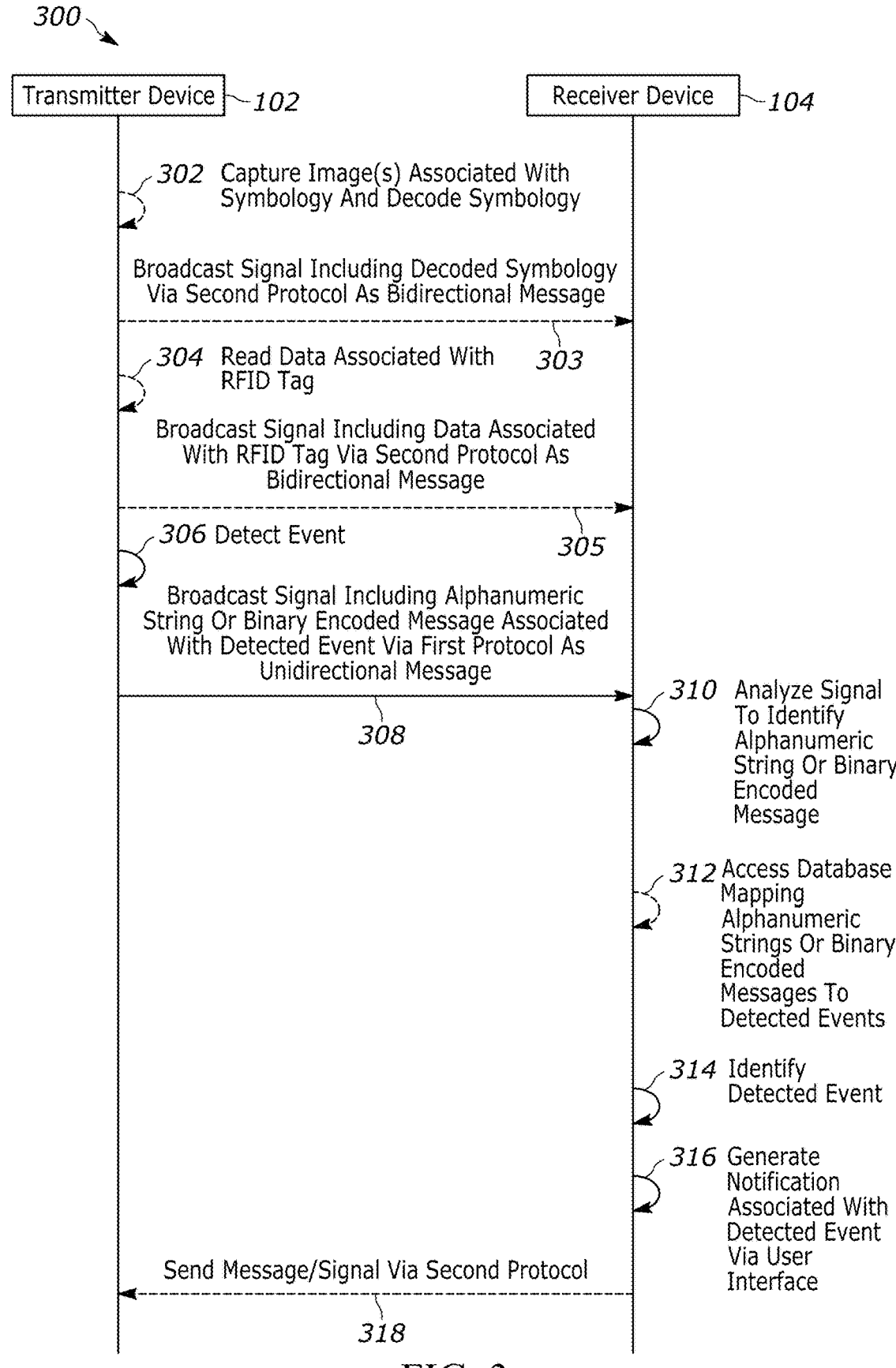
FIG. 3 illustrates an example signal diagram associated with embodiments of the present invention, such as techniques for broadcasting user indications from devices that do not include a user interface display or verbal audio capabilities to devices that do include a user interface display or verbal audio capabilities.
Figure 4:
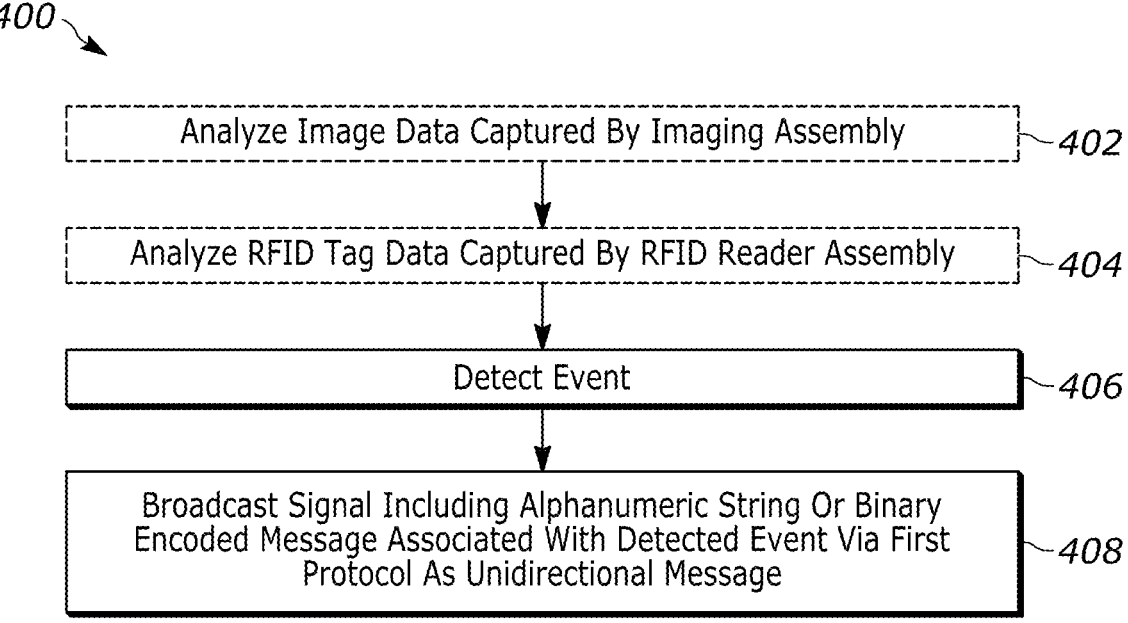
FIG. 4 illustrates an example flow diagram associated with embodiments of the present invention, such as techniques for broadcasting user indications from devices that do not include a user interface display or verbal audio capabilities to devices that do include a user interface display or verbal audio capabilities.

The processors 214 may interact with the memory 216 to obtain, for example, machine-readable instructions stored in the memory 216 corresponding to, for example, the operations represented by the diagrams of this disclosure, including the signal diagram 300 shown at FIG. 3 and/or the flow diagram 400 shown at FIG. 4. In particular, the instructions stored in the memory 216, when executed by the processors 214, may cause the processors 214 to execute a decode module application 218, and/or an event detection module 220 stored on the memory 216.

In some examples, executing the decode module application 218 may include analyzing an image of the symbology 205 associated with the item 206 captured by the imaging assembly 204 in order to decode a payload associated with the symbology 205. For instance, in some examples, executing the decode module application 218 may include sending an indication of a payload associated with the symbology 205 to one or more of the receiver devices 104 with a bi-directional signal via the second protocol. Similarly, in some examples, executing the instructions stored on the memory 216 may include sending data associated with the RFID tag 209 that is read by the RFID reader assembly 208 to one or more of the receiver devices 104 with a bi-directional signal via the second protocol. Furthermore, in some examples, executing the instructions stored on the memory 216 may include receiving responsive bi-directional signals from one or more of the receiver devices 104 via the second protocol.

Additionally, in some examples, executing the event detection module 220 may include detecting an event, and sending a unidirectional broadcast signal 202 associated with the event to the receiver device(s) 104 via the first protocol. For example, the signal 202 may include a message associated with the event, and the message may include an alphanumeric string or binary encoded message that corresponds to a particular event. For instance, one alphanumeric string or binary encoded message may correspond to a first event or first type of event, while another alphanumeric string or binary encoded message may correspond to a second event or second type of event.

In some examples, the event detection module 220 may detect the event based on the payload of the symbology 205, and/or based on data read from the RFID tag 209. For instance, the event detection module 220 may determine that an "expired item" event has occurred based on comparing an expiration date for the item 206 and/or the item 210 that is included the payload of the symbology 205, and/or the data read from the RFID tag 209 to a current date. For instance, a first alphanumeric string or a binary encoded message may correspond to the "expired item" event.

As another example, the event detection module 220 may detect the event based on image data associated with the item 206 and/or the item 210 captured by the imaging assembly 204. For instance, the event detection module 220 may analyze the image data associated with the item 206 and/or the item 210 captured by the imaging assembly 204 to determine that an "incorrect item placement" event has occurred based on the location of the item within the image data, e.g., with respect to a weighing scale or platter of a POS device. For instance, a second alphanumeric string or a binary encoded message may correspond to the "incorrect item placement" event.

As still another example, the event detection module 220 may detect the event based on other sensor data captured by other sensors of the transmitter device 102. For instance, the event detection module 220 may analyze location data captured by a GPS sensor or other location sensor (not shown) of the transmitter device 102 to determine that a "device outside of geofence" event has occurred based on comparing the location of the transmitter device 102 as determined by the GPS sensor or other location sensor to a geofence range associated with, for instance, a retail environment in which the transmitter deice 102 is utilized. For instance, a third alphanumeric string or a binary encoded message may correspond to the "device outside of geofence" event.

The receiver device(s) 104 may receive the unidirectional signal 202 from the transmitter device 102 via the first protocol at respective communication interface(s) 222. The receiver device(s) 104 may further include respective user interface(s) 224 via which the receiver device(s) 104 may provide information, such as notifications, to users (e.g., via verbal audio, via a display screen, etc.), and receive inputs from users. Additionally, the receiver device(s) 104 may include respective processors 226 and memories 228. The processors 226 may interact with respective memories 228 to obtain, for example, machine-readable instructions stored in the memories 228 corresponding to, for example, the operations represented by the diagrams of this disclosure, including the signal diagram 300 shown at FIG. 3 and/or the flow diagram 400 shown at FIG. 4.

In particular, the instructions stored in the memories 228, when executed by the processors 226, may cause the processors 226 to analyze the alphanumeric string or a binary encoded message from the unidirectional signal 202 to identify an associated event. In some examples, the receiver device(s) 104 may analyze the alphanumeric string or a binary encoded message from the unidirectional signal 202 to identify an associated event by accessing an event database 230 that stores indications of alphanumeric strings or binary encoded messages associated with respective events. For instance, the receiver device(s) 104 may communicate with the event database 230 via signals 232 of a wired or wireless communication network.

In some examples, upon identifying the event, a given receiver device 104 may determine whether the event is relevant to users of the particular receiver device 104, and in some cases may "drop" the event if the event is not relevant to the users of the particular receiver device 104. For example, an event related to item placement at a POS may be relevant for a POS receiver device 104, but may not be relevant for a smartphone receiver device 104, or may only be relevant for particular smartphone receiver devices 104. For instance, in some embodiments, particular receiver devices 104 may subscribe to a service that provides data mapping respective alphanumeric strings to respective detected events (e.g., a service that provides access to the database 232), and other receiver devices 104 that do not subscribe to the service may drop the event.

If the event is not dropped, the instructions stored in the memories 228, when executed by the processors 226, may cause the processors 226 to generate a notification associated with the event and provide the notification to a user via respective user interfaces 224, e.g., using via a verbal audio communication and/or via a display screen communication.

Furthermore, in some examples, the instructions stored in the memories 228, when executed by the processors 226, may cause the processors 226 to receive bi-directional signals from the transmitter device 102 via the second protocol, and/or send bi-directional signals to the transmitter device 102 via the second protocol.

FIG. 3 illustrates an example signal diagram 300 associated with embodiments of the present invention, such as techniques for broadcasting user indications from devices that do not include a user interface display or verbal audio capabilities to devices that do include a user interface display or verbal audio capabilities.

As shown in the signal diagram 300, a transmitter device 102 may, optionally, capture images associated with a symbology and decode the symbology (302). Furthermore, the transmitter device 102 may, optionally, broadcast a signal including the decoded symbology to one or more receiver device 104 via a second protocol (303).

Moreover, the transmitter device 102 may, optionally read data associated with an RFID tag (304). Furthermore, the transmitter device 102 may, optionally, broadcast a signal including the data associated with the RFID tag to one or more receiver device 104 via a second protocol (305).

The transmitter device 102 may detect an event (306), which may or may not be based on the decoded symbology and/or the data from the RFID tag. Furthermore, the transmitter device may broadcast a signal, to one or more receiver device 104, including an alphanumeric string or binary encoded message associated with the detected event via a first protocol as a unidirectional message (308). The receiver device 104 may analyze the signal to identify the alphanumeric string or binary encoded message (310). Optionally, the receiver device 104 may access a database mapping alphanumeric strings or binary encoded messages to detected events (312). The receiver device 104 may identify the detected event based on the alphanumeric string or binary encoded message (314), and may generate a notification associated with the detected event (316) and provide the notification via a user interface. In some examples, the receiver device 104 may optionally send a message or other signal to the transmitter device 102 via the second protocol, which is distinct from and different from the first protocol.

FIG. 4 illustrates an example flow diagram 400 associated with embodiments of the present invention, such as techniques for broadcasting user indications from devices that do not include a user interface display or verbal audio capabilities to devices that do include a user interface display or verbal audio capabilities. The steps of the flow diagram 400 may be performed by executing computer readable instructions stored on a memory by one or more processors, such as the memory 216 and the processor 214 of a transmitter device 102 that does not include a user interface display or verbal audio capabilities.

Optionally, at block 402, the method 400 may include analyzing image data captured by an imaging assembly 204 of the transmitter device 102. For instance, this may include capturing, by an imaging assembly 204 of the transmitter device, images of a symbology 205, and decoding a payload of the symbology 205. In some examples, block 402 may further include the transmitter device 102 sending a bi-directional signal associated with the decoded payload of the symbology 205 to one or more receiver devices 104 via a second protocol.

Furthermore, optionally, at block 404, the method 400 may include analyzing RFID data captured by an RFID reader assembly 208 of the transmitter device 102. For instance, this may include detecting nearby RFID tags 209 and/or reading data associated with the nearby RFID tags 209. In some examples, block 404 may further include the transmitter device 102 sending a bi-directional signal associated with the RFID tag data to one or more receiver devices 104 via a second protocol.

In some examples, the method 400 may further include receiving, via the second protocol, a bi-directional response signal, from one or more of the receiver devices 104, that is receivable and interpretable by the transmitter device 102.

At block 406, the method 400 may include detecting an event. For instance, in some examples, the detected event may be associated with the data captured by the imaging assembly 204 and/or the RFID reader assembly 208. In other examples, the detected event may be associated with the location of the transmitter device 102, and/or the locations of one or more items 206, 210.

At block 408, the method 400 may include broadcasting a signal 202 including one or more of an alphanumeric string or a binary encoded message associated with the detected event. The signal 202 may be broadcast as a unidirectional message, via a first protocol, and may be receivable by a plurality of receiver devices 104 that each include a respective user interface comprising one or more of a user interface display or verbal audio capabilities.

For instance, the receiver devices 104 may be configured to receive the broadcasted signal 202 from the transmitter device 102, analyze the signal 202 to identify the event associated with the signal 202, and generate a notification associated with the event via respective user interfaces 224, without transmitting any response signals via the first protocol that are receivable and interpretable by the transmitter device. In some examples, one or more of the receiver devices 104 may be subscribers of a service that provides data mapping respective alphanumeric strings to respective detected events, and may be configured configured to analyze the alphanumeric string of the unencrypted signal to identify the detected event associated with the alphanumeric string based on the subscription data mapping respective alphanumeric strings to respective detected events.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAS, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for broadcasting user indications, comprising:
   a transmitter device that does not include a user interface display or verbal audio capabilities, the transmitter device being configured to:
      detect an event; and
      broadcast a signal including one or more of an alphanumeric string or a binary encoded message associated with the detected event via a first protocol that is receivable by a plurality of receiver devices, the signal being broadcast as a unidirectional message; and
   a receiver device that includes a user interface comprising one or more of a user interface display or verbal audio capabilities, the receiver device being configured to:
      receive the broadcasted signal from the transmitter device;
      analyze the signal to identify the event associated with the signal; and
      generate a notification associated with the event via the user interface, without transmitting, via the first protocol, a response signal that is receivable and interpretable by the transmitter device.

2. The system of claim 1, wherein the transmitter device includes an imaging assembly configured to capture images of a symbology and a decode module configured to decode a payload of the symbology, wherein the transmitter device is further configured to transmit the decoded payload of the symbology via a bi-directional message transmitted via a second protocol.

3. The system of claim 2, wherein the receiver device is configured to transmit, via the second protocol, a response signal that is receivable and interpretable by the transmitter device.

4. The system of claim 1, wherein the transmitter device includes a radiofrequency identification (RFID) assembly configured to read data associated with an RFID tag, wherein the transmitter device is further configured to transmit an indication of the data associated with the RFID tag via a bi-directional message transmitted via a second protocol.

5. The system of claim 1, wherein the signal includes the alphanumeric string, and wherein the receiver device is a subscriber of a service that provides data mapping respective alphanumeric strings to respective detected events, and is configured to analyze the alphanumeric string of the unencrypted signal to identify the detected event associated with the alphanumeric string based on the data mapping respective alphanumeric strings to respective detected events.

6. A transmitter device for broadcasting user indications that does not include a user interface display or verbal audio capabilities, wherein the transmitter device is configured to perform steps comprising:
   detecting an event; and
   broadcasting a signal including one or more of an alphanumeric string or a binary encoded message associated with the detected event, the signal being broadcast as a unidirectional message, via a first protocol that is receivable by a plurality of receiver devices that each include a respective user interface comprising one or more of a user interface display or verbal audio capabilities,
   wherein each of the plurality of receiver devices are configured to receive the broadcasted signal from the transmitter device, analyze the signal to identify the event associated with the signal, and generate a notification associated with the event via the user interface, without transmitting, via the first protocol, a response signal that is receivable and interpretable by the transmitter device.

7. The transmitter device of claim 6, further comprising an imaging assembly configured to capture images of a symbology and a decode module configured to decode a payload of the symbology, wherein the transmitter device is further configured to transmit the decoded payload of the symbology via a bi-directional message transmitted via a second protocol.

8. The transmitter device of claim 7, wherein the transmitter device is further configured to receive, via the second protocol, a response signal from one of the plurality of receiver devices that is receivable and interpretable by the transmitter device.

9. The transmitter device of claim 6, further comprising a radiofrequency identification (RFID) assembly configured to read data associated with an RFID tag, wherein the transmitter device is further configured to transmit an indication of the data associated with the RFID tag via a bi-directional message transmitted via a second protocol.

10. The transmitter device of claim 6, wherein the signal includes the alphanumeric string, and wherein the receiver device is a subscriber of a service that provides data mapping respective alphanumeric strings to respective detected events, and is configured to analyze the alphanumeric string of the unencrypted signal to identify the detected event associated with the alphanumeric string based on the data mapping respective alphanumeric strings to respective detected events.

11. A method for broadcasting user indications performed by a transmitter device that does not include a user interface display or verbal audio capabilities, the method comprising:

detecting an event; and broadcasting a signal including one or more of an alphanumeric string or a binary encoded message associated with the detected event, the signal being broadcast as a unidirectional message, via a first protocol that is receivable by a plurality of receiver devices that each include a respective user interface comprising one or more of a user interface display or verbal audio capabilities, wherein each of the plurality of receiver devices are configured to receive the broadcasted signal from the transmitter device, analyze the signal to identify the event associated with the signal, and generate a notification associated with the event via the user interface, without transmitting, via the first protocol, a response signal that is receivable and interpretable by the transmitter device.

12. The method of claim 11, further comprising:

capturing, by an imaging assembly of the transmitter device, images of a symbology;

decoding a payload of the symbology; and transmitting the decoded payload of the symbology via a bi-directional message transmitted via a second protocol.

13. The method of claim 12, further comprising:

receiving, via the second protocol, a response signal from one of the plurality of receiver devices that is receivable and interpretable by the transmitter device.

14. The method of claim 11, further comprising:

reading, by a radiofrequency identification (RFID) reader of the transmitter device, data associated with an RFID tag; and transmitting an indication of the data associated with the RFID tag via a bi-directional message transmitted via a second protocol.

15. The method of claim 11, wherein the signal includes the alphanumeric string, and wherein the receiver device is a subscriber of a service that provides data mapping respective alphanumeric strings to respective detected events, and is configured to analyze the alphanumeric string of the unencrypted signal to identify the detected event associated with the alphanumeric string based on the data mapping respective alphanumeric strings to respective detected events.

* * * * *